United States Patent
Cheston et al.

(10) Patent No.: US 8,086,840 B2
(45) Date of Patent: Dec. 27, 2011

(54) APPARATUS, SYSTEM, AND METHOD FOR IMPROVING USER BOOT VIA A STORAGE AREA NETWORK

(75) Inventors: Richard Wayne Cheston, Morrisville, NC (US); Mark Charles Davis, Durham, NC (US); Howard Locker, Cary, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 513 days.

(21) Appl. No.: 12/361,529

(22) Filed: Jan. 28, 2009

(65) Prior Publication Data

US 2010/0191946 A1    Jul. 29, 2010

(51) Int. Cl.
*G06F 9/00* (2006.01)
*G06F 9/24* (2006.01)
*G06F 13/00* (2006.01)
*G06F 15/177* (2006.01)

(52) U.S. Cl. ............. 713/2; 713/1; 711/114; 709/217; 709/218; 709/220

(58) Field of Classification Search ............... 713/1, 2; 709/217, 218, 220; 711/114
See application file for complete search history.

(56) References Cited

U.S. PATENT DOCUMENTS

| | | | | |
|---|---|---|---|---|
| 6,651,165 | B1 * | 11/2003 | Johnson | 713/2 |
| 7,093,120 | B2 * | 8/2006 | Keohane et al. | 713/2 |
| 7,415,506 | B2 * | 8/2008 | Gajjar et al. | 709/215 |
| 2006/0155831 | A1 * | 7/2006 | Chandrasekaran | 709/220 |
| 2006/0168192 | A1 * | 7/2006 | Sharma et al. | 709/224 |
| 2006/0248325 | A1 * | 11/2006 | Fung | 713/1 |

* cited by examiner

*Primary Examiner* — Mark Connolly
(74) *Attorney, Agent, or Firm* — Kunzler Needham Massey & Thorpe (57) ABSTRACT

An apparatus, system, and method are disclosed for remotely booting a client from a storage area network ("SAN"). A connection module enables a client, such as a diskless client, to connect to two or more storage area networks ("SANs"), the SANs belonging to a group of redundant SANs, each SAN in the group redundantly storing at least a portion of substantially identical operating system data for the client. The boot module enables the client to remotely boot an operating system from the two or more redundant SANs. The boot module makes at least one read request to each of the two or more connected SANs, each read request configured to retrieve a disparate portion of the operating system data for loading the operating system onto the client. The boot module loads the operating system onto the client using a combination of data retrieved from the two or more connected SANs.

25 Claims, 5 Drawing Sheets

APPARATUS, SYSTEM, AND METHOD FOR IMPROVING USER BOOT VIA A STORAGE AREA NETWORK

FIELD

This invention relates to remotely booting a client and more particularly relates to remotely booting an operating system on a client by using two or more redundant storage area networks ("SANs") to simultaneously retrieve different portions of an operating system.

BACKGROUND

Description Of The Related Art

A Storage Area Network ("SAN") is a topology used to attach remote computer storage devices (such as disk arrays, tape libraries, optical jukeboxes, etc.) in such a way that the devices appear as locally attached to the operating system. For example, a remote device might appear to the client as drive 'C' even though the referenced drive is located remotely. Thus, clients can be operated to utilize the remote devices as though they are local devices such as hard-disk drives commonly found in a personal computer. Typically, clients communicate with a SAN via a mapping layer to form a network. Most storage networks use a small computer system interface ("SCSI") protocol. For example, a SCSI protocol may be mapped over TCP/IP in a mapping protocol referred to as iSCSI ("Internet SCSI"). The iSCSI protocol allows clients to send SCSI commands to the SAN over an IP network.

SANs are frequently configured to utilize a redundant array of independent disks ("RAID") in order to achieve greater levels of performance, reliability, and larger data volume sizes. A RAID system allows the simultaneous use of two or more hard disk drives to help increase data reliability and I/O performance. In one common RAID configuration, a first disk and a second redundant disk may be utilized to store substantially identical data such that if one disk fails, the second redundant disk maintains the integrity of the data.

In some systems, a group of SANs may be utilized to perform functions such as synchronous or asynchronous replication, wherein transactions are simultaneously written to some or all SANs in the group. In such a system, each of the SANs in the group may include substantially identical data, such as operating system data, that can be loaded from the SAN onto the client. One example of a group of SANs configured to store redundant, replicated data is called a SAN cluster. The redundant replication of data on more than one SAN provides increased data reliability and increased performance. In some embodiments, each SAN in a group may contain only a portion of data for the client is stored on each SAN in the group.

Today, SANs are limited by the number of I/O operations that a disk drive can perform in a RAID array. While SANs are very good at transferring large amounts of sequential data, they are not very good at transferring a large number of small, random data requests. This is because once you make a relationship between a SAN and an iSCSI initiator (client), the iSCSI protocol binds the media access control ("MAC") address of the network interface card ("NIC") to the initiator (client) name. This is done to improve routing performance and to allow for fast recovery in the event that TCP/IP packets are dropped, or lost, and typically, a SAN will remember a connection for several minutes to allow for bad/high latency connections. There are no currently known methods to utilize multiple SANs to stripe data or to perform cascade reads across multiple SANs. Thus, conventional SAN configurations are not typically amenable to random data access requests.

Furthermore, conventional SANs may be limited where a plurality of clients all seek to access data on a SAN or group of SANs simultaneously. In such a case, a client may get assigned to a SAN that is particularly slow due to a large amount of network traffic, even though other, faster SANs are available for use. This prevents the SANs from transferring data at an optimal efficiency level.

The present invention seeks to solve the problems associated with conventional SANs.

SUMMARY

From the foregoing discussion, it should be apparent that a need exists for an apparatus, system, and method that allows improved access to SANs. Beneficially, such an apparatus, system, and method would allow a client to determine which SAN or SANs in a group of SANs (with redundant, replicated data) provides the best performance. Then the client may allocate read requests accordingly to SANs with the best performance. Such an invention would preferably allow a user to establish a connection with and read replicated data simultaneously from two or more SANs. Such functionality would improve communication speeds between clients and SANs while allowing data reliability to be maintained. The present invention provides such an apparatus, system, and method.

In one embodiment, the present invention employs a means to establish multiple iSCSI sessions to multiple SANs to perform a cascade read on data redundantly stored on each SAN. Such functionality is particularly useful when booting an operating system from a SAN to a client. A client is able to retrieve disparate portions of data from multiple different SANs, such as from each SAN in a SAN cluster, where each SAN in the cluster includes a copy of needed data. Although a SAN cluster is one example of a group of SANs that may contain replicated data, other configurations are contemplated. For example, each SAN in a group may include only a portion of data for the client. In such a situation, a SAN may not have a complete copy of all needed data, so the client may obtain unavailable data from another SAN or data source. Thus, the present invention allows a client to make requests to multiple SANs, determine which SAN or SANs respond most quickly, and allocate more requests to the most efficient SANs.

The present invention has been developed in response to the present state of the art, and in particular, in response to the problems and needs in the art that have not yet been fully solved by currently available SAN systems. Accordingly, the present invention has been developed to provide an apparatus, system, and method for booting a client remotely from a storage area network that overcome many or all of the above-discussed shortcomings in the art.

The apparatus to boot remotely from a storage area network is provided with a plurality of modules including a connection module and a boot module. The connection module enables a client, such as a diskless client, to connect to two or more storage area networks ("SANs"), the SANs belonging to a group of redundant SANs, each SAN in the group redundantly storing substantially identical operating system data for the client. The boot module enables the client to remotely boot an operating system from the two or more redundant SANs. In one embodiment, the boot module makes at least one read request to each of the two or more connected SANs, each read request configured to retrieve a disparate portion of the operating system data for loading the operating system onto the client. The boot module may also load the operating system onto the client using a combination of data retrieved from the two or more connected SANs. In this manner, a client can simultaneously retrieve data from two SANs in order facilitate quicker data retrieval and boot times.

In a further embodiment, the boot module sequentially makes a predetermined number of read requests to each of the two or more connected SANs, determines a relative response efficiency for each connected SAN based on the response of each SAN to the predetermined number of read requests, and allocates read requests to the SANs according to the relative response efficiency of each connected SAN. In this manner, more read requests may be allocated to SANs with a quicker data retrieval time. For example, allocating read requests to the SANs according to the relative response efficiency of each SAN may include allocating more read requests to SANs with a higher relative response efficiency than to SANs with a lower relative response efficiency.

In some embodiments, the boot module may continuously update the relative response efficiency for each connected SAN until the operating system is loaded. Subsequently, the boot module may re-allocate read requests to the SANs according to the updated relative response efficiency of each SAN.

In one embodiment, the boot module may update the relative response efficiency for each connected SAN after a predetermined number of additional read requests, and they may re-allocate read requests to the SANs according to the updated relative response efficiency for each connected SAN.

In one embodiment, determining the relative response efficiency for each connected SAN includes, for each read request, recording a size of the data requested in the read request and recording the response time of a corresponding SAN to the read request. In a further embodiment, determining the relative response efficiency for each connected SAN further comprises recording an average response time per byte based on the recorded size of data requested and response time of the corresponding SAN. Subsequently, the read requests may be allocated based on an inverse relationship to the recorded average response times for each connected SAN on the list.

In another embodiment, the boot module may remove an unresponsive SAN from a list of SANs eligible to receive read allocations in response to the unresponsive SAN failing to respond to a read request. Thus, if a SAN is temporarily or permanently unavailable, that SAN will no longer receive read requests. In a further embodiment, the boot module may periodically test the removed SAN for responsiveness and place the removed SAN back on the list in response to the removed SAN regaining responsiveness.

In one embodiment, the remote connections between the client and the SANs are internet small computer system interface ("iSCSI") connections.

A system of the present invention is also presented for booting remotely from a storage area network. The system in the disclosed embodiments substantially includes the steps necessary to carry out the functions presented above with respect to the operation of the described apparatus. In one embodiment, the system includes a client, two or more starage area networks ("SANs"), a connection module, and a boot module.

In one embodiment, the connection module establishes a simultaneous connection between the client and two or more storage area networks ("SANs"), the SANs belonging to a group of redundant SANs, each SAN in the group redundantly storing substantially identical operating system data for the client. The boot module enables the client to remotely boot an operating system from the two or more redundant SANs. In one embodiment, the boot module makes read requests to each of the two or more connected SANs, each read request configured to retrieve a disparate portion of the operating system data for loading the operating system onto the client. The boot module also loads the operating system onto the client using a combination of data retrieved from the two or more connected SANs.

In various embodiments, the system may include one or more additional clients, two or more additional SANs belonging to one or more additional groups of redundant SANs, and one or more additional boot modules that enable the one or more additional clients to remotely boot an operating system from the two or more additional SANs.

A method and a computer program product are also presented for the present invention to remotely boot a client from a storage area network. The method and computer program product in the disclosed embodiments substantially includes the steps necessary to carry out the functions presented above with respect to the operation of the described apparatus and system. In one embodiment, the steps include establishing a simultaneous connection between a client and two or more SANs belonging to a group of redundant SANs, each SAN in the group redundantly storing substantially identical operating system data for the client. In various embodiments, the steps also may include remotely booting an operating system on the client from the two or more redundant SANs by making a predetermined number of read requests to each SAN in the group; determining a relative response efficiency for each SAN in the group based on the response of each SAN to the predetermined number of read requests made to each SAN in the group; allocating read requests to one or more SANs in the group according to the relative response efficiency of each SAN, the read requests retrieving the operating system data for loading the operating system onto the client; and loading the operating system onto the client using data retrieved from the two or more connected SANs.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
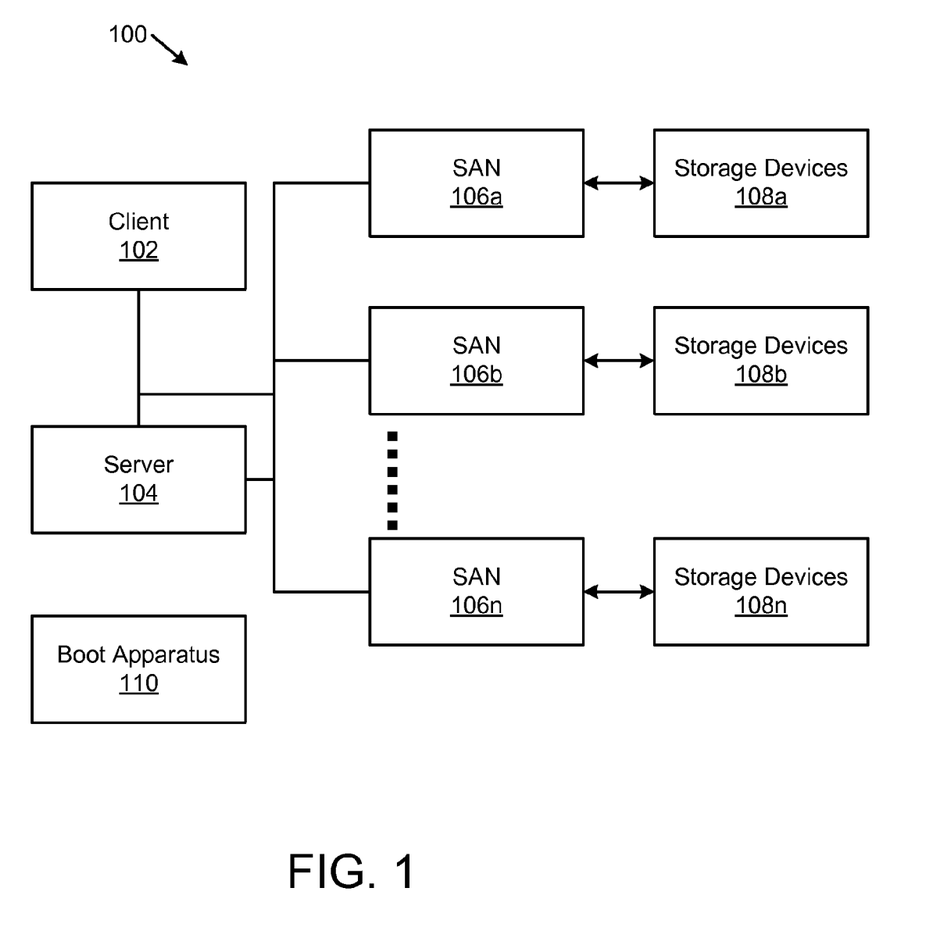
FIG. 1 is a schematic block diagram illustrating one embodiment of a system for remotely booting a client in accordance with the present invention.

FIG. 1 is a schematic block diagram illustrating one embodiment of a system 100 for remotely booting a client 102 in accordance with the present invention. As depicted in this embodiment, the system 100 includes a client 102, server 104, two or more storage area networks ("SANs") 106a-n, storage devices 108a-n, and a boot apparatus 110. In one configuration, the client 102 accesses the two or more SANs via the server 104 in order to access data stored on the storage devices 108a-n.

A client 102 is an application or system that accesses remote services and data on a server 104. The client 102 is preferably a computer system or an application on a computer system such as a diskless client, a personal computer, a laptop, or other computer system capable of connecting to a SAN as recognized by those of skill in the art. Preferably, the client 102 includes at least a memory for storing and retrieving data and processor for processing computer operations.

A diskless client is commonly used for remote booting because such a client lacks a disk for storing operating system data locally and depends on remote data for most of its software and storage needs. However, a diskless client may generate significant network traffic due to its continual need to procure operating system software and virtual memory space from across the network. The present invention contemplates the use of both diskless clients and clients with a local hard-drive or other storage device. The client 102 is configured to boot an operating system from one or more of the SANs 106a-n. In further embodiments of the system 100, a plurality of additional clients 102 may be included.

The server 104 is an application or computer system that provides services to and manages data transfers for the client 102. The server 104 typically has its own operating system that is configured to efficiently handle server operations. Various types of servers 104 and server operating systems may used in conjunction with the present invention. A few examples may include Windows, pSeries, iSeries, UNIX, zSeries, and others as recognized by those of skill in the art. In various embodiments, a plurality of servers 104 may be included in the system 100. In such a system, the plurality of servers 104 may be connected to one or more clients 102 via a network such as a local area network ("LAN"). In this manner, each client 102 can access each server 104 in a network, and each server 104 can provide a path to one or more of the SANs 106a-n. The server 104 is typically used to broker a connection between the client 102 and a SAN 106a-n. Once a connection is established, the client 102 communicates directly with the SANs 106a-n and can retrieve data directly from the SANs 106a-n to which it is connected.

A SAN 106a-n is a specialized, high-speed network that attaches servers 104 to storage devices 108a-n and enables access to data stored on the storage devices 108a-n. A SAN 106a-n typically allows "any-to-any" connections across a network using interconnect elements such as routers, gateways, hubs, switches and directors. A SAN 106a-n typically eliminates the traditional dedicated connection between a server and storage. Instead, each client 102 is able to connect to each storage device 108a-n via a SAN 106a-n. Each SAN 106a-n in the system may include various components such as storage elements, storage devices, computer systems, and control software for communicating with the server 104 and client 102.

Preferably, the SANs 106a-n are redundant SANs set up for synchronous (or asynchronous in some embodiments) replication of data, meaning that every transaction is written simultaneously on all applicable SANs 106a-n. Redundant SANs are utilized to provide data integrity protection and to allow continued access to the data in the SANs 106a-n in the event that one of the SANs 106a-n fails. In one embodiment, the SANs 106a-n may be implemented as a SAN cluster. However, the SANs 106a-n need not be organized as a cluster and other configurations are contemplated as long as each SAN in a group includes some portion of data for the client 102. For example, each SAN 106a-n need not redundantly store all of applicable data for a client 102. In some embodiments, it may be desirable to redundantly store only a portion of client data on each SAN 106a-n. In other embodiments, a SAN 106a may not include a complete copy of data needed by a client 102. Thus, the client 102 may obtain needed data from a second SAN 106b in order to obtain a complete copy of needed data.

SANs 106a-n commonly use the SCSI protocol for communication between servers 104 and storage devices 108a-n. Typically, a mapping layer to other protocols is used to form the network. For example, iSCSI is the mapping of SCSI over TCP/IP and Fibre Channel Protocol ("FCP") is the mapping of SCSI over Fibre Channel. In accordance with the present invention, the client 102 preferably establishes a connection with a SAN 106a-n via iSCSI protocol. However, other types of mapping protocols are contemplated such as FCP and HyperSCSI.

The storage devices 108a-n may include various types memory and data storage devices such as hard-disk, disk arrays, tape libraries, optical jukeboxes, flash memory, etc. and other data storage devices recognized by those of skill in the art. The storage devices 108a-n store data and applications that may be transferred to or from the client 102 or server 104. For example, in one embodiment, each group of storage devices 108a-n as connected to a SAN 106a-n may include operating system data for the client 102. Thus, the client 102 may connect to a particular SAN 106a at startup to retrieve boot data for loading an operating system onto the client 102. Once booting takes place, the client 102 is able to run programs and applications using the loaded operating system.

The boot apparatus 110 provides the logic, code, and/or hardware needed to boot the client 102 remotely. In various embodiments, various components of the boot apparatus 110 may be spread across the various components of the system 100 including the client 102, server 104, SANs 106a-n, and storage devices 108a-n. In some embodiments, the boot apparatus 110 may be configured to reside in a single location such as on the client 102, the server 104, the SANs 106a-n, or the storage devices 108a-n, and the system can then utilize the boot apparatus 110 to manage the operations needed to remotely boot the client 102. For example, in one embodiment, the client 102 may retrieve a boot loader comprising the boot apparatus upon startup of the client 102. The boot loader may then assist the client 102 in downloading operating system data from one or more SANs 106a-n by allowing the client 102 to establish connections and manage retrieved data.

In one embodiment, a connection may be established between the client 102 and at least one SAN 106a-n. Preferably, the connection is an iSCSI connection that allows the client 102 to access data via the attached group of SANs 106a-n. In various embodiments, the client 102 may retrieve a boot loader or similar application from one of the SANs 106a-n, or the boot loader may be alternately stored on the client 102 or server 104. Once the boot loader is running, it typically makes its own connection with one or more SANs 106a-n to load an operating system or software.

In one embodiment of the present invention, the boot loader or boot apparatus 110 may load data that contains a listing of the locations of all the SANs 106a-n that are members of the group from which the client 102 is loading the operating system data. Then the boot apparatus 110 may establish connections with a plurality of SANs 106a-n to retrieve operating system data in a cascade read fashion. For example, one portion of the operating system may be retrieved from one SAN 106a, while another portion is retrieved from another SAN 106b. In this manner, the client 102 is able to more quickly and efficiently load its operating system data. The server 104 may be used to initially broker connections between the client 102 and the plurality of SANs 106a-n. However, once a connection is established, the client 102 maintains communication and data retrieval directly from the SANs 106a-n.

In accordance with the present invention, the boot apparatus 110 may also retrieve information indicating where particular data is located. For example, the boot apparatus 110 may retrieve a catalog-of-information that includes a list of data sources or SANs 106a-n that include operating system data for the client 102. Then, the client 102 may access each applicable SAN 106a-n that includes operating system data for the client 102 in order to retrieve data during the boot process.

Figure 2:
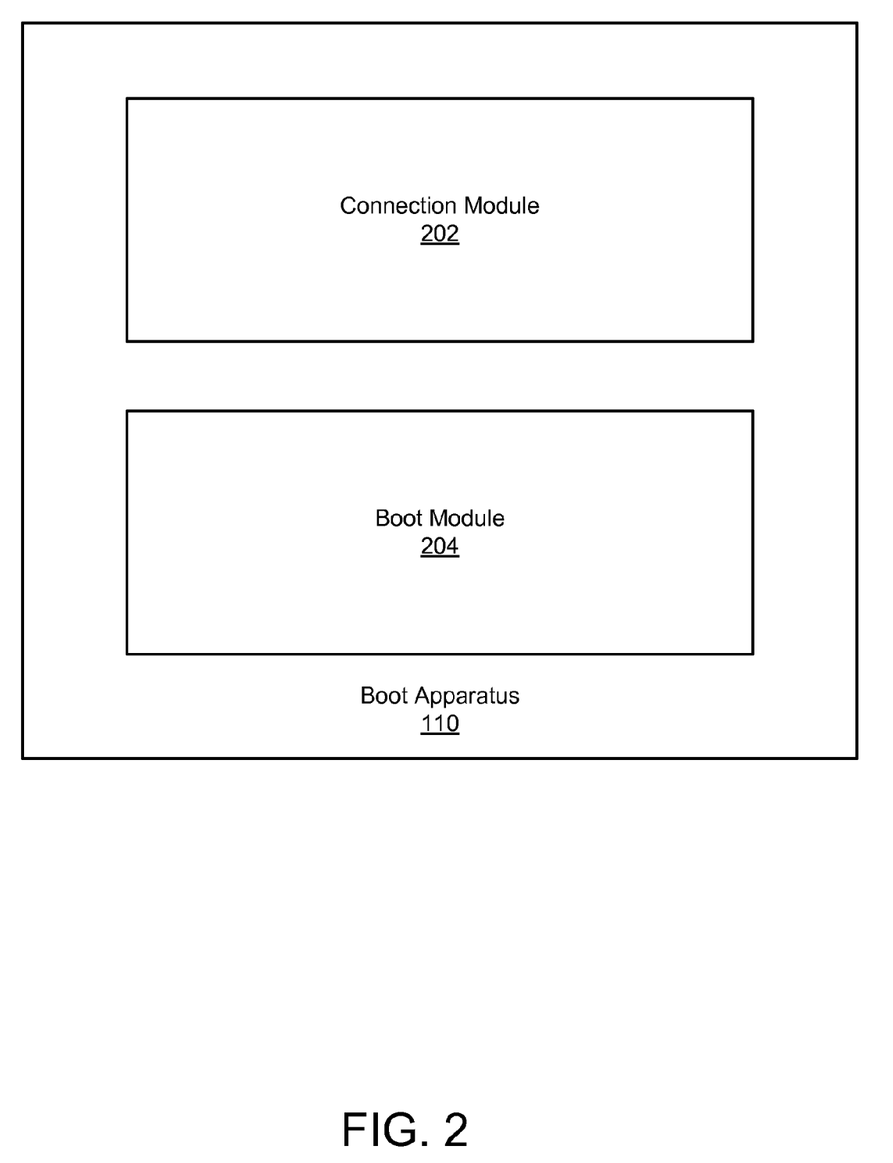
FIG. 2 is a schematic block diagram illustrating one embodiment of a boot apparatus for remotely booting a client in accordance with the present invention.

As depicted in FIG. 2, the boot apparatus may include a connection module 202 and boot module 204. The connection module 202 is preferably configured to establish a simultaneous connection between the client 102 and two or more SANs 106a-n in a group of SANs configured to redundantly store at least a portion of substantially identical operating system data for the client 102. In some embodiments, each SAN 106a-n in the group may include a complete copy of operating system data for the client 102. Because the SANs 106a-n store substantially identical operating system data, the client 102 may simultaneously retrieve disparate portions of the operating system data from each of the SANs 106a-n.

The connection module 202 is preferably configured to establish separate connections between the client 102 and each SAN 106a-n in the group. For example, the connections module 202 may establish multiple iSCSI connections such that a separate iSCSI connection is created between the client 102 and each applicable SAN 106a-n. Preferably, iSCSI connections are used, but different types of mapping topologies as recognized by those of skill in the art are also contemplated. Once the connections are established, the boot apparatus 110 may then allocate read requests to each of the SANs 106a-n to retrieve data such as operating system data.

The boot module 204 enables the client 102 to remotely boot an operating system from the two or more redundant SANs 106a-n. It may utilize a boot loader retrieved from one of the SANs 106a-n or other storage location to accomplish this task. The boot module 204 enables booting of the client 102 by making read requests to each of two or more connected SANs 106a-n that contain the client's operating system data. Each read request sent by the boot module 204 is preferably configured to retrieve a disparate portion of the operating system data for loading the operating system onto the client 102. For example, a read request sent to a first SAN 106a may retrieve a first sector of operating system data, and another read request sent to a second SAN 106b may retrieve a second sector of operating system such that the retrieved operating system data may be combined by the boot apparatus 110 to eventually load a complete copy of the operating system data onto the client 102. Thus, the boot module 204 is configured to load the operating system onto the client 102 by using a combination of data retrieved from two or more of the redundant SANs 106a-n.

In further embodiments, the boot module 204 may sequentially make a predetermined number of read requests to each of two or more connected SANs 106a-n in order to determine which SANs 106a-n are operating most efficiently. The boot module 204 may determine a relative response efficiency for each connected SAN 106a-n based on the response of each SAN 106a-n to the predetermined number of read requests. For example, the boot module 204 may send ten read requests to each SAN 106a-n and determine how efficient each SAN 106a-n is in retrieving the requested data.

Then, the boot module 204 may allocate read requests to one or more of the SANs 106a-n according to the relative response efficiency of each connected SAN 106a-n. For example, if the boot module 204 determines that a particular SAN 106a is operating much more efficiently than the other connected SANs 106b-n, then the boot module 204 may allocate all read requests to that SAN 106a. Preferably, however, the boot module 204 allocates read requests to each connected SAN 106a-n according to the relative response efficiency of each SAN 106a-n such that more read requests are allocated to SANs 106a-n with a higher efficiency and fewer read requests are allocated to SANs 106a-n with a lower efficiency.

In some embodiments, the boot module 204 may continuously update the relative response efficiencies for each connected SAN 106a-n until the operating system is loaded. For example, one SAN 106a may operate more efficiently initially, but during loading of the operating system, a different SAN 106b may have its resources freed up such that it becomes the most efficient SAN 106a-n. In such a case, the boot module 204 may re-allocate read requests to the SANs 106a-n according to the updated relative response efficiency of each SAN 106a-n. In this manner, the boot apparatus 110 ensures that the most efficient SANs 106a-n are receiving the most read requests. Thus, the overall boot time of the operating system will be minimized.

In one embodiment, the boot module 204 may only periodically update the relative response efficiencies for each connected SAN 106a-n. For example, the boot module 204 may reevaluate the response efficiencies after a predetermined number of additional read requests (ie: 100 requests) have been executed. After each update of the relative response efficiencies of each SAN 106a-n, the boot module may re-allocate read requests to the SANs 106a-n such that the most efficient SAN 106a-n receives the most read requests.

In one embodiment, determining the relative response efficiency for each connected SAN 106a-n may include, for each read request, recording a size of the data requested in the read request and recording the response time of a corresponding SAN 106a-n to the read request. For example, the boot module 204 may record the number of bytes retrieved in a read request and the amount of time it took for the corresponding SAN 106a-n to retrieve the bytes. In some embodiments, the boot module 204 may determine an average response time per byte and determine the relative response efficiency for each SAN 106a-n accordingly. In some cases, the read requests may be allocated based on an inverse relationship to the recorded average response times for each connected SAN 106a-n. In one embodiment, the client 102 may maintain a table for recording efficiency data.

It is possible that one or more SANs 106a-n may become unresponsive during boot of the operating system. In such a case, the boot module 204 may be configured to remove an unresponsive SAN 106a-n from a list of SANs eligible to receive read allocations. For example, if a SAN 106a-n fails to respond to a read request, the boot module 204 may stop sending read requests to that SAN 106a-n. In some embodiments, the boot module 204 may periodically test to see if a removed SAN 106a-n has regained responsiveness. If it has regained responsiveness, then the boot module 204 may again allocate read requests to that SAN 106a-n.

Figure 3:
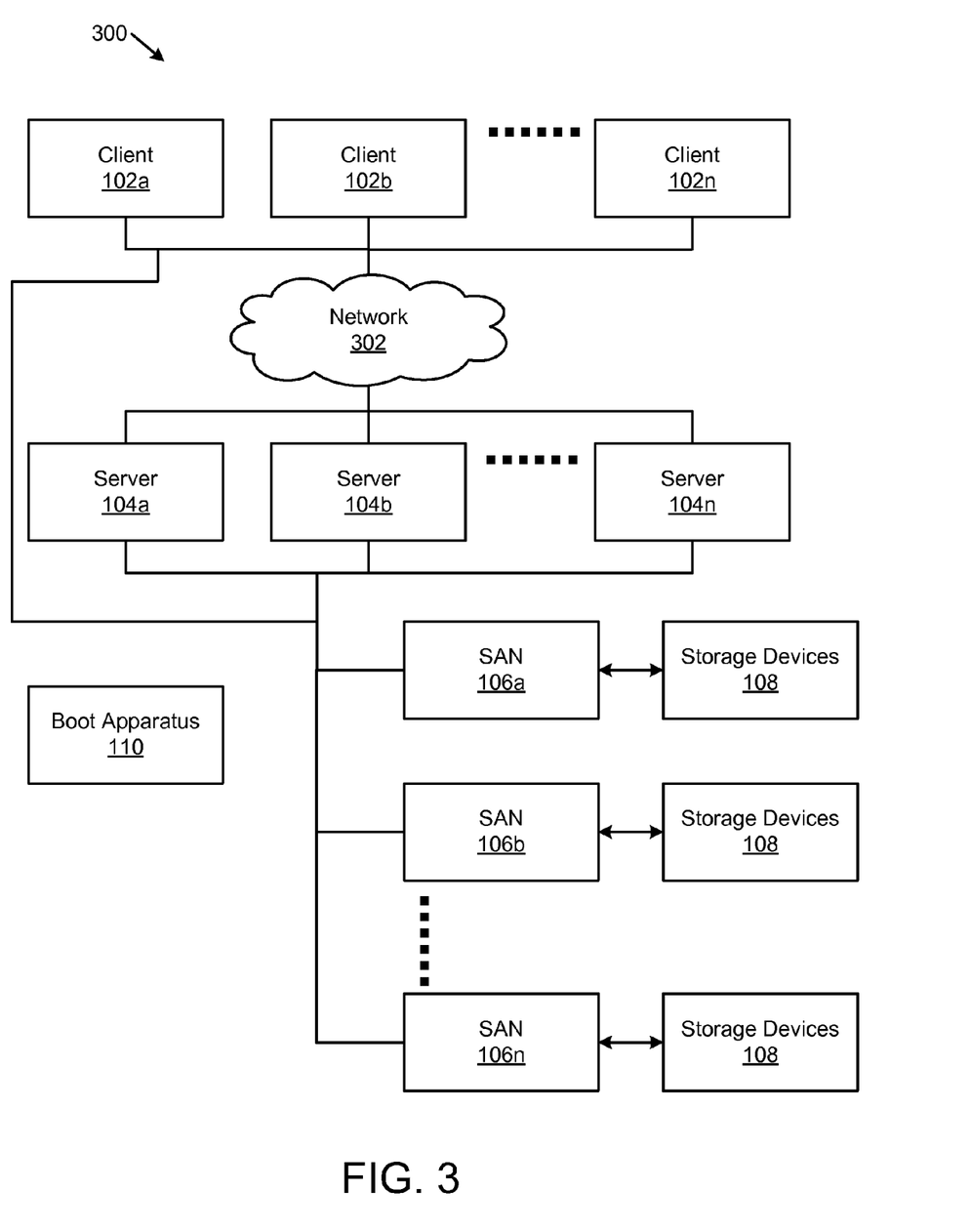
FIG. 3 is a schematic block diagram illustrating another embodiment of a system for remotely booting a client in accordance with the present invention.

FIG. 3 depicts another embodiment of a system 300 for remotely booting one or more clients 102a-n by using data retrieved from two or more SANs 108a-n. The system 300 includes one or more clients 102a-n connected via a network 302 to one or more servers 104a-n in order to access one or more SANs 106a-n. The boot apparatus 110 operates as described above with regard to the system 100. In some embodiments, each client 102a-n may include its own boot apparatus 110 for remotely booting from two or more of the SANs 106a-n, or alternatively a central management agent may control booting for all of the applicable clients 102a-n by allocating read requests according to relative response efficiencies of the SANs 106a-n.

A common problem with remote booting is where many clients 102a-n try to boot at the same time. For example, a business may employ a group of people that all begin work at the same time, so they are likely to arrive at work and attempt to boot their computers (clients 102a-n). This can result in high usage of network resources which can lead to very slow boot times for the clients 102a-n. In conventional systems, each client 102a-n would be assigned to a SAN 106a and would use that SAN 106a until its operating system was completely loaded regardless of whether or not more efficient SANs 106b-n had become available. The present invention solves such problems, by allocating read requests for each client 102a-n to the SANs 106a-n with the fastest response times and by scattering the read requests across multiple SANs 106a-n to simultaneously retrieve data from the various SANs.

Figure 4:
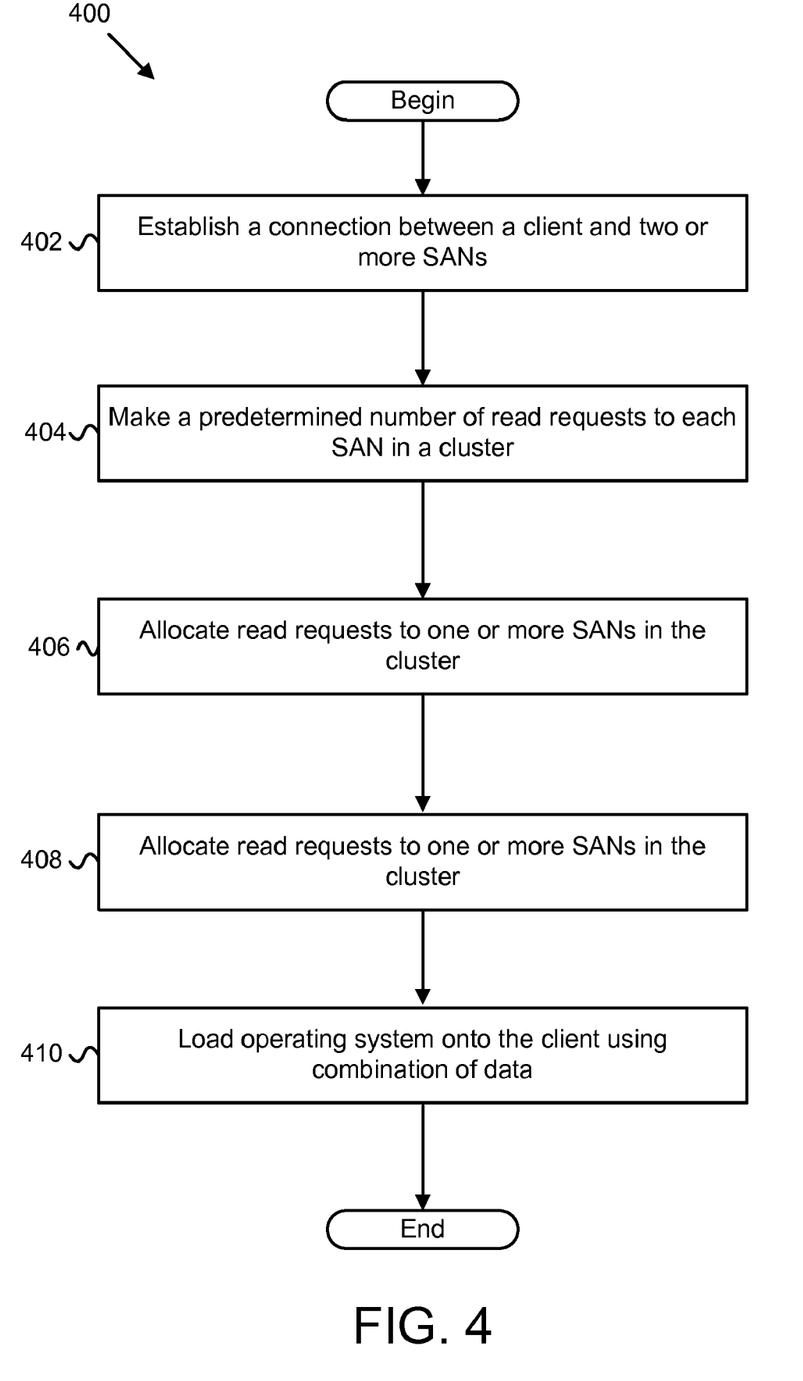
FIG. 4 is a schematic flow chart diagram illustrating one embodiment of a method for remotely booting a client in accordance with the present invention.

FIG. 4 is a schematic flow chart diagram illustrating one embodiment of a method 400 for remotely booting a client 102 in accordance with the present invention. The method 400 substantially includes the steps necessary to carry out the embodiments and functions of the systems 100, 300 and boot apparatus 110 described above. The method 400 begins when a connection module 202 establishes 401 a connection between a client 102 and two or more SANs 106a-n belonging to a group of redundant SANs 106a-n. Preferably, separate iSCSI connections are established between the client 102 and each applicable SAN 106a-n. Each SAN 106a-n preferably stores substantially identical operating system data for the client 102. The operating system data is used by the client 102 to boot an operating system remotely from the SANs 106a-n. In various embodiments, each SAN need not redundantly store all of the operating system data for client 102.

For example, each SAN may hold only a portion of data for the client 102, and the boot apparatus 110 may be utilized to retrieve a complete copy of data for the client 102 by accessing a plurality of data-sources or SANs 106a-n. In one embodiment, a list or catalog-of-information may be retrieved by the client 102 that indicates which SANs 106a-n contain which data. Thus, the client 102 can subsequently make read requests to retrieve needed data according to the catalog-of-information. For example, one SAN 106a may not contain a complete copy of data needed for the client 102. Thus, the catalog-of-information may indicate a source (ie: SAN 106b) where additional data may be obtained in order to get a complete copy of data for the client 102.

In order to boot the operating system, a boot module 204 makes 404 a predetermined number of read requests to each SAN 106a-n in the group. For example, ten or one-hundred read requests may initially be made to each SAN 106a-n. Then the boot module 204 determines 406 a relative response efficiency for each SAN 106a-n in the group based on the response of each SAN 106a-n to the predetermined number of read requests. For example, the boot module 204 may determine how long it takes for each SAN 106a-n to complete the predetermined number of read requests, or the boot module 204 may determine an average amount of time per byte of data to determine a relative response efficiency.

Then, the boot module 204 allocates 408 read requests to one or more SANs 106a-n in the group according to the relative response efficiency of each SAN 106a-n. For example, the boot module 204 may allocate more read requests to SANs 106a-n with a better relative response efficiency. The read requests are used to retrieve operating system data for booting an operating system on the client 102. In a preferred embodiment, read requests are allocated to more than one SAN 106a-n to retrieve disparate portions of the operating system data simultaneously from a plurality of SANs 106a-n.

Finally, the boot module 204 loads 410 the operating system onto the client 102 using a combination of data retrieved from the two or more connected SANs 106a-n. Thus, the boot module 204 enables a type of cascade read of data from the SANs 106a-n which contain substantially identical, redundant operating system data. In this manner, the operating system can be efficiently booted on the client 102 by retrieving data simultaneously from a plurality of SANs 106a-n and by allocating read requests to the more efficient SANs 106a-n.

Figure 5:
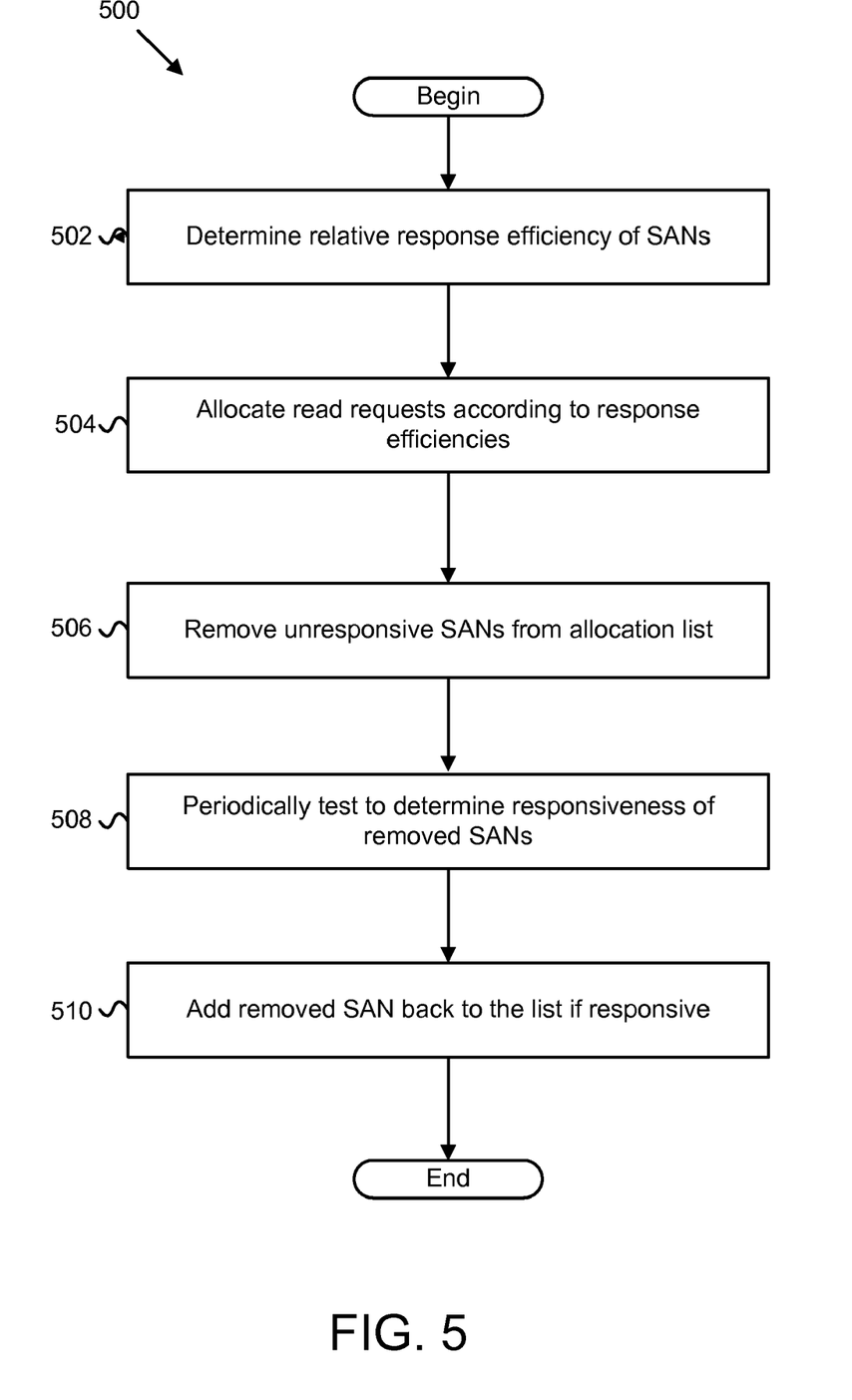
FIG. 5 is a schematic flow chart diagram illustrating one embodiment of a method for removing unresponsive SANs in accordance with the present invention.

FIG. 5 is a schematic flow chart diagram illustrating one embodiment of a method 500 for removing unresponsive SANs 106a-n from a SAN-up list in accordance with the present invention. The method 500 operates similar to the method 400 in that it determines 502 a relative response efficiency of SANs 106a-n in a SAN group and allocates 504 read requests according to those determined response efficiency. However, in some cases, one or more SANs 106a-n may become unresponsive during boot of the client 102, so the method 500 provides a way to handle unresponsive SANs 106a-n.

A SAN-up list or other type of list may be utilized to keep track of which SANs 106a-n are in a group, the SANs 106a-n having operating system data stored thereon for booting an operating system onto the client 102. In one embodiment of the method 400, the boot module 204 removes 506 an unresponsive SAN 106a-n from a list of SANs 106a-n eligible to revive read allocations in response to the unresponsive SAN 106a-n failing to respond to a read request. In such a case, the boot module 204 may then stop allocating read requests to the unresponsive SAN 106a-n.

In further embodiments of the method 400, the boot module 204 may periodically test 508 the removed SAN 106a-n for responsiveness and may add 510 the removed SAN 106a0n back on the list if the removed SAN 106a-n regains responsiveness. Subsequently, read requests may again be allocated to the SAN 106a-n.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to boot remotely from a storage area network, the apparatus: comprising:
   a connection module that establishes a simultaneous connection between a client and two or more storage area networks ("SANs"), the SANs belonging to a group of redundant SANs, each SAN in the group redundantly storing at least a portion of substantially identical operating system data for the client; and
   a boot module that enables the client to remotely boot an operating system from the two or more redundant SANs, the operations performed by the boot module comprising:
      making at least one read request to each of the two or more connected SANs, each read request configured to retrieve a disparate portion of the operating system data for loading the operating system onto the client, and
      loading the operating system onto the client using a combination of data retrieved from the two or more connected SANs.

2. The apparatus of claim 1, wherein the operations performed by the boot module further comprise sequentially making a predetermined number of read requests to each of the two or more connected SANs, determining a relative response efficiency for each connected SAN based on the response of each SAN to the predetermined number of read requests, and allocating read requests to one or more connected SAN according to the relative response efficiency of each connected SAN.

3. The apparatus of claim 2, wherein allocating read requests to one or more connected SANs according to the relative response efficiency of each connected SAN comprises allocating more read requests to SANs with a higher relative response efficiency than to SANs with a lower relative response efficiency.

4. The apparatus of claim 2, wherein the operations performed by the boot module further comprise continuously updating the relative response efficiency for each connected SAN until the operating system is loaded.

5. The apparatus of claim 4, wherein the operations performed by the boot module further comprise re-allocating read requests to the SANs according to the updated relative response efficiency of each SAN.

6. The apparatus of claim 2, wherein the boot module further comprises updating the relative response efficiency for each connected SAN after a predetermined number of additional read requests and re-allocating read requests to the SANs according to the updated relative response efficiency for each connected SAN.

7. The apparatus of claim 2, wherein determining the relative response efficiency for each connected SAN comprises, for each read request, recording a size of the data requested in the read request and recording the response time of a corresponding SAN to the read request.

8. The apparatus of claim 7, wherein determining the relative response efficiency for each connected SAN further comprises recording an average response time per byte based on the recorded size of data requested and response time of the corresponding SAN.

9. The apparatus of claim 8, wherein the read requests are allocated based on an inverse relationship to the recorded average response times for each connected SAN.

10. The apparatus of claim 1, wherein the operations performed by the boot module further comprise removing an unresponsive SAN from a list of SANs eligible to receive read allocations in response to the unresponsive SAN failing to respond to a read request.

11. The apparatus of claim 10, wherein the operations performed by the boot module further comprise periodically testing the removed SAN for responsiveness and placing the removed SAN back on the list in response to the removed SAN regaining responsiveness.

12. The apparatus of claim 1, wherein the remote connections between the client and the SANs are internet small computer system interface ("iSCSI") connections.

13. A system to boot remotely from a storage area network, the system comprising:
a client;
two or more storage area networks ("SANs");
a connection module that establishes a simultaneous connection between the client and two or more storage area networks ("SANs"), the SANs belonging to a group of redundant SANs, each SAN in the group redundantly storing at least a portion of substantially identical operating system data for the client; and
a boot module that enables the client to remotely boot an operating system from the two or more redundant SANs, the operations performed by the boot module comprising:
making read requests to each of the two or more connected SANs, each read request configured to retrieve a disparate portion of the operating system data for loading the operating system onto the client, and
loading the operating system onto the client using a combination of data retrieved from the two or more connected SANs.

14. The system of claim 13, further comprising one or more additional clients.

15. The system of claim 14, further comprising two or more additional SANs belonging to one or more additional groups of redundant SANs.

16. The system of claim 13, wherein the operations performed by the boot module further comprise sequentially making a predetermined number of read requests to each of the two or more connected SANs, determining a relative response efficiency for each connected SAN based on the response of each SAN to the predetermined number of read requests, and allocating read requests to one or more connected SAN according to the relative response efficiency of each connected SAN.

17. The system of claim 16, wherein allocating read requests to one or more connected SANs according to the relative response efficiency of each connected SAN comprises allocating more read requests to SANs with a higher relative response efficiency than to SANs with a lower relative response efficiency.

18. A computer program product comprising a computer readable storage medium having computer usable program code executable to perform operations for booting remotely from a storage area network, the operations of the computer program product comprising:
establishing a simultaneous connection between a client and two or more SANs belonging to a group of redundant SANs, each SAN in the group redundantly storing at least a portion of substantially identical operating system data for the client; and
remotely booting an operating system on the client from the two or more redundant SANs by
making a predetermined number of read requests to each SAN in the group,
determining a relative response efficiency for each SAN in the group based on the response of each SAN to the predetermined number of read requests made to each SAN in the group,
allocating read requests to one or more SANs in the group according to the relative response efficiency of each SAN, the read requests retrieving the operating system data for loading the operating system onto the client, and
loading the operating system onto the client using a combination of data retrieved from the two or more connected SANs.

19. The computer program product of claim 18, wherein allocating read requests to one or more SANs in the group according to the relative response efficiency of each SAN comprises allocating more read requests to SANs with a higher relative response efficiency than to SANs with a lower relative response efficiency.

20. The computer program product of claim 18, wherein determining a relative response efficiency for each SAN in the group comprises, for each read request, recording a size of the data requested in the read request and recording the response time of a corresponding SAN to the read request.

21. The computer program product of claim 20, wherein determining a relative response efficiency for each SAN in the group further comprises recording an average response time per byte based on the recorded size of data requested and response time of the corresponding SAN.

22. The computer program product of claim 21, wherein the read requests are allocated based on an inverse relationship to the recorded average response times for each SAN in the group.

23. A method for booting remotely from a storage area network, the method comprising:

establishing a simultaneous remote connection between a client and two or more SANs belonging to a group of redundant SANs, each SAN in the group redundantly storing at least a portion of substantially identical operating system data for the client; and remotely booting an operating system on the client from the two or more redundant SANs by making read requests to each of the two or more connected SANs, each read request configured to retrieve a disparate portion of the operating system data for loading the operating system onto the client, and loading the operating system onto the client using data retrieved from the two or more connected SANs.

24. The method of claim 23, wherein remotely booting further comprises sequentially making a predetermined number of read requests to each of the two or more connected SANs, determining a relative response efficiency for each connected SAN in the group based on the response of each SAN to the predetermined number of read requests, and allocating read requests to one or more connected SANs in the group according to the relative response efficiency of each SAN.

25. The method of claim 24, wherein allocating read requests to one or more connected SANs according to the relative response efficiency of each connected SAN comprises allocating more read requests to SANs with a higher relative response efficiency than to SANs with a lower relative response efficiency.

* * * * *